Figure 1:
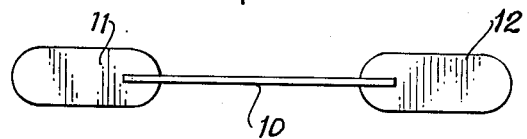

April 24, 1962     C. O. VOGT     3,031,634

STRAIN GAUGE

Filed April 4, 1960

INVENTOR.
Calvin O. Vogt
BY
Ooms, McDougall, Williams and Hersh
Attorneys

United States Patent Office 3,031,634
Patented Apr. 24, 1962

3,031,634
STRAIN GAUGE
Calvin O. Vogt, Tulsa, Okla., assignor to Century Geophysical Corporation, Tulsa, Okla., a corporation of Delaware
Filed Apr. 4, 1960, Ser. No. 19,733
4 Claims. (Cl. 338—2)

This invention relates to novel strain gauges of the semiconductor type. An especially useful form of the invention comprises an assembly wherein my novel strain gauge is combined with a protective attachment jig in a manner particularly adapted for convenient application of the gauge to the object wherein strain is to be measured.

It has been known for some time that semiconductor materials such as silicon, germanium, and indium-antimonide have the property of changing resistance to a substantial degree when strained. This property, it has been recognized, makes materials of this class potentially useful as strain gauges.

Practical utilization of semiconductor materials as strain gauges has been seriously hampered, however, by difficulties associated with attachment of electrical leads to the semiconductor elements and with secure mechanical bonding of the semiconductor element to the object wherein strain is to be measured.

To be useful in a strain-gauge application, a semiconductor material is preferably in the form of a tiny bar or sliver which inherently is brittle, fragile, and easily broken. Attachment of lead wires to such minute strain-sensitive bars by prior-art methods has been so difficult as to make mass production of semiconductor strain gauges impracticable.

Moreover, because of the very tiny physical dimensions of semiconductor bars suitable for strain measurement, a very real problem has been encountered in attaching such a strain-sensitive element to a specimen in which strain is to be measured. Conventional electrical strain gauges are commonly made of foil, and it is customary to cement such gauges to the specimen. When that same technique has been attempted with semiconductor strain-sensitive elements, great difficulties have been encountered, because the readily available cements have proved incapable of bonding the gauge effectively to the specimen. Because of the tendency of the strain-sensitive semiconductor elements to slip or creep in the cement, it has been most difficult to obtain accurate strain measurements.

In the present invention, I have solved effectively the problem of electrical connection to the terminals of the strain-sensitive element and, at the same time, have solved the problem of effective bonding between the strain-gauge element and the specimen in which strain is to be measured. In achieving this novel and desirable result, I have provided a strain-gauge element which comprises an elongated sliver of a suitable semiconductor crystal, in combination with a pair of relatively large, electrically conducting tabs, which are fused to the strain-sensitive crystal at its respective terminals.

Not only do the tabs provide a convenient means of making good ohmic contact with the semiconductor element; they also provide a very effective means, characterized by large surface area, for bonding the strain gauge to the specimen, known cements in general use being completely effective for this purpose.

In addition to the novel strain gauge just described, my invention also includes an assembly of particular utility, comprising in combination a strain gauge made as above described and an attachment jig which supports the strain gauge, protecting it against damage prior to actual use, and at the same time affording a most convenient mechanical means for bonding the strain gauge to the specimen in which strain is to be measured.

In the foregoing general description of the invention, several important objects and advantages have been noted, and still others will be apparent from the following detailed description of specific embodiments thereof.

Figure 2:
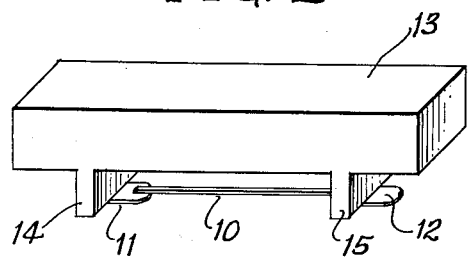
Figure 3:
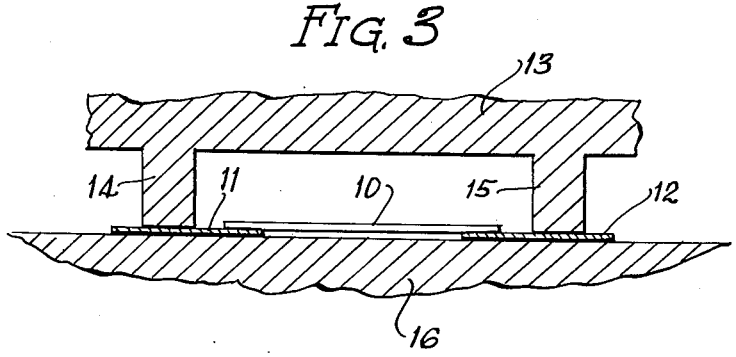

In the appended drawing, FIGURE 1 shows a typical strain gauge according to my invention, comprising an elongated semiconductor crystal of minute cross section, in combination with a pair of large-area terminal tabs. FIG. 2 illustrates the form of my invention in which a strain gauge of the FIG. 1 type is mounted on a protective attachment jig for shipping and handling prior to use. FIG. 3 illustrates the manner in which the jig-mounted strain gauge of FIG. 2 may be applied to the surface of a specimen in which strain is to be measured, FIG. 3 being a sectional view that brings out clearly the procedure by which the strain gauge proper is transferred from the attachment jig to the surface of the specimen.

Referring now to FIG. 1, I show therein a crystalline semiconductor strain-sensitive element 10 which may be made of silicon or other semiconductor material having strain-sensitive properties. In a typical embodiment of the invention, the strain-sensitive element 10 may be made of P-type silicon cut in the 111 direction, having cross-sectional dimensions of .006 by .006 inch and a length of about .35 inch. A semiconductor bar of such small cross section is extremely fragile and must be carefully cut and etched to prevent nicks, pits, or scratches.

Disposed at each end of the bar 10 is a relatively large flat tab, respectively designated in FIG. 1 by the reference numerals 11 and 12. Tabs 11 and 12 are preferably made from a material having an expansion coefficient similar to silicon, such as that commercially sold under the trade name "Kovar," coated with a thin layer of gold alloy containing 1% gallium. The gold cladding is very thin, about .00025 inch being sufficient.

The size of the tabs 11 and 12 may be varied considerably, so long as a large surface area is provided, by comparison to the cross-sectional dimensions of the semiconductor bar 10. In a typical embodiment, each tab may be about .075 inch in width, about .15 inch in length, and about .003 inch in total thickness. The ends of the semiconductor bar 10 will preferably overlap the respective tabs 11 and 12 by about .05 inch.

In manufacturing a strain gauge according to my invention, the overlapping ends of the bar 10 and the tabs 11 and 12 are fused together to provide a good ohmic (non-rectifying) contact between the respective ends of the bar 10 and the tabs 11 and 12. This fusion technique per se is known to the art and need not be described here in detail. It is carried out in an inert atmosphere at a temperature of about 450° C. Such a fusion technique is generally employed in the manufacture of transistors and other devices using semiconductor materials, and detailed descriptions of the process may be found in the literature. See, for example, Chapter 8 on metal semiconductor contacts, in the Handbook of Semiconductor Electronics, edited by Lloyd P. Hunter and published by McGraw-Hill Publishing Company.

In manufacturing strain gauges according to my invention, great care should be used in carrying out the fusion step, to prevent nicking and other mechanical damage to the semiconductor bar in the fusion zones.

The strain gauge just described and illustrated in FIG. 1 is a highly useful device even without the addition of the attachment jig heretofore referred to and illustrated in FIG. 2. Thus, the FIG. 1 strain gauge may be bonded to a specimen wherein strain is to be measured, by cementing the under surfaces of tabs 11 and 12 to the specimen, or attachment may be made by clamping, spot welding, or soldering. The surface area of the tabs 11 and 12 is sufficiently great to permit their being effectively anchored to a specimen by means of cements in general use.

My invention is particularly useful, however, when employed in the combination shown in FIG. 2, wherein the strain gauge proper is factory-mounted on an attachment jig before being packed and shipped. As illustrated in FIG. 2, the attachment jig 13 consists of a rigid block having a pair of projecting bosses respectively designated 14 and 15, the bosses being symmetrically shaped, and so dimensioned as to register centrally with the tabs 11 and 12 when a strain gauge of the FIG. 1 type is bridged across them. The attachment jig 13 may be made of a suitable mechanically rigid material, such as metal, thermosetting plastic, or wood.

The upper surfaces of the tabs 11 and 12 are secured to the bottom surfaces of the bosses 14 and 15 respectively by means of a cement or other adhesive having a low break-away force. As illustrative of such an adhesive, I have found that the "mold release" compound commonly used for releasing molding materials has sufficient bonding strength to hold the gauge securely to the jig for shipping and handling.

When assembled as shown in FIG. 2, the strain gauge and attachment jig are packed and shipped with the gauge secured to the jig, and the ultimate user will normally leave the gauge and jig joined together until such time as the strain gauge is actually ready for application to a specimen.

When the strain gauge is to be used, a cement having strong bonding characteristics is spread over the surface of the specimen 16 on which the gauge is to be attached, and a coating of the same cement is also applied to the bottom surfaces of the tab 11 and 12, which, of course, are readily accessible, the tabs 11 and 12 being attached to the jig 13 via their upper surfaces. Thereupon, the bottom surfaces of the tabs 11 and 12 are firmly pressed against the cement-coated surface of the specimen 16 and pressure is applied thereto via the jig 13. Since the jig 13 is rigid, a strong pressure can be applied to bond the tabs to the specimen 16 without the slightest risk of damage to the delicate strain-sensitive element 10.

When the strong bonding cement which joins the tabs 11 and 12 to the specimen 16 has had an opportunity to set, the jig 13 can then readily be broken away from the tabs 11 and 12, since the cement which holds the tabs to the bosses 14 and 15 has relatively weak adhesive properties. This step leaves the strain gauge securely bonded to the specimen, so that it will undergo stresses and strains directly corresponding to those experienced by the specimen. Once the strain gauge has been attached to the specimen, electrical contact to the tabs 11 and 12 may be made via their upper surfaces by conventional means such as clamping or soldering.

While I have in this specification described in some detail certain specific embodiments of my invention, it should be understood that the description is intended to be exemplary rather than limiting. It is my desire that the scope of my invention be determined primarily by reference to the appended claims.

I claim:

1. A strain gauge comprising a rod-shaped strain-sensitive semiconductor element having width and thickness dimensions of less than .01 inch and having a length at least fifty times greater than the larger of said width and thickness dimensions, and a pair of tabs, said tabs being disposed at the respecitve ends of said strain-sensitive element in overlapping relation therewith and being fused thereto to define ohmic electrical contacts with the respective ends of said strain-sensitive element, said tabs being made of a ductile metal coated with a thin layer of gold alloy containing gallium, the extent of overlap between said element and each of said tabs being at least five times as great as the larger of said width and thickness dimensions of said strain-sensitive element, the thickness of said tab being less than .01 inch and the surface area of said tab being substantially greater than that of said strain-sensitive element.

2. A strain gauge comprising a small rod-shaped strain-sensitive semiconductor element and a pair of tabs, said tabs being respectively disposed at the ends of said strain-sensitive element in overlapping relation therewith and being fused thereto to define ohmic electrical contacts with the respective ends of said element, said tabs being formed of ductile metal clad with a thin layer of an alloy containing gold and gallium and being characterized by large surface area by comparison to the surface area of said strain-sensitive element, the length and width of each tab being at least several times greater than the largest cross-sectional dimension of said strain-sensitive element.

3. A strain gauge according to claim 2 wherein said tabs are made of a base material having an expansion coefficient similar to that of said semiconductor element.

4. A strain gauge according to claim 2 wherein said tabs are made of a base material having an expansion coefficient similar to that of said semiconductor element, and wherein the gallium content of said alloy is in the neighborhood of 1%.

References Cited in the file of this patent

UNITED STATES PATENTS

| | | |
|---|---|---|
| 2,457,616 | Van Dyke et al. | Dec. 28, 1948 |
| 2,466,337 | Thurston et al. | Apr. 5, 1949 |
| 2,866,014 | Burns | Dec. 23, 1958 |
| 2,929,885 | Mueller | Mar. 22, 1960 |
| 2,963,773 | Starr | Dec. 13, 1960 |

OTHER REFERENCES

Smith, Charles S.: Physical Review, vol. 94, pp. 42–49 (1954).

Mason, W. P.: Bell Telephone System Technical Publications, Monograph 3326, pp. 1–15 (October 1949).